United States Patent [19]

Weber et al.

[11] Patent Number: 5,139,146
[45] Date of Patent: Aug. 18, 1992

[54] CONTAINER FOR MAGNETIC TAPE CASSETTES WITH CASSETTE LOCK

[75] Inventors: Wilfried Weber, Schopfloch-Unteriflingen; Hans-Peter Heizmann, Lossburg-Lombach; Eduard Kaupp, Waldachtal 3/Tumlingen; Wolfgang Nehl, Waldachtal 3/Tumlingen; Hartmut Rothfuss, Waldachtal 3/Tumlingen, all of Fed. Rep. of Germany

[73] Assignee: fischerwerke Artur Fischer GmbH & Co. KG, Waldachtal 3/Tumlingen, Fed. Rep. of Germany

[21] Appl. No.: 712,133

[22] Filed: Jun. 6, 1991

[30] Foreign Application Priority Data

Jun. 25, 1990 [DE] Fed. Rep. of Germany ....... 4020163

[51] Int. Cl.5 .......................................... B65D 85/672
[52] U.S. Cl. .................................. 206/387; 206/444; 206/493
[58] Field of Search ............... 206/387, 444, 310, 312, 206/493; 312/9, 12, 15, 16

[56] References Cited

U.S. PATENT DOCUMENTS 4,087,145  5/1978  Weavers ..................... 206/387 X
4,265,369  5/1981  Aboussoonan .............. 206/387 X
4,399,913  8/1983  Gelardi et al. .................. 206/387
4,760,502  7/1988  Ackeret ....................... 206/444 X
4,875,578 10/1989  Nehl ............................. 206/387 X
4,875,584 10/1989  Ackeret ........................... 206/387

FOREIGN PATENT DOCUMENTS 019180   2/1986  European Pat. Off. .
3702628  8/1987  Fed. Rep. of Germany .
3904787  8/1990  Fed. Rep. of Germany .
1580720  9/1969  France ............................. 206/387
2099793 12/1982  United Kingdom ............. 206/387

Primary Examiner—Paul T. Sewell
Assistant Examiner—BethAnne Cicconi
Attorney, Agent, or Firm—Michael J. Striker

[57] ABSTRACT

A container for magnetic tape cassettes has a housing having a plurality of insertion openings, a plurality of base plates subdividing the housing into a plurality of individual compartments, arresting elements provided on the base plate and engaging in a reel hub of a cassette to prevent their turning, elements for guiding the cassettes and including complementary guides provided on the housing, elements for stressing a cassette in an inserted position and including a spring element arranged on a rear wall of the housing, and a releasable catch element provided on the base plate and holding a cassette in the inserted position.

7 Claims, 2 Drawing Sheets

CONTAINER FOR MAGNETIC TAPE CASSETTES WITH CASSETTE LOCK

BACKGROUND OF THE INVENTION

The present invention relates to a container for magnetic tape cassettes.

More particularly, it relates to such a container for magnetic tape cassettes which has a housing with several insertion openings and several individual compartments separated by base plates.

In order to store magnetic tape cassettes in motor vehicles, containers are known which are divided by the base plates into several individual compartments for receiving individual cassettes. To secure the cassette reels the base plates are provided with resilient arresting devices which engage the hubs of the reels when the cassette has been inserted into the compartment. The arresting devices at the same time prevent the tape cassette from falling out of the container. This function requires relatively strong clamping forces and stable arresting devices. As a result the cassettes can be damaged during insertion and ejection. Moreover, it is difficult to remove the cassette from the container because when the cassette has been pushed fully in, there is only a limited access to get hold of a cassette depending on the spacing of the cassettes.

SUMMARY OF THE INVENTION

Accordingly, it is an object of the present invention to provide a container for magnetic tape cassettes which avoids the disadvantages of the prior art.

More particularly, it is an object of the present invention to provide a container for magnetic tape cassettes, which is easy to manufacture and insures easy removal of the cassettes.

In keeping with these objects and with others which will become apparent hereinafter, one feature of the present invention resides, briefly stated, in that the housing is provided with complementary guides and the base plate is arranged to be inserted in the complementary guides and locked in the housing, a spring element is arranged on the rear wall and stressed by the cassette in its inserted position, and the base plate has a releasable catch element which holds the inserted cassette.

When the container for magnetic tape cassettes is designed in accordance with the present invention, it eliminates the disadvantages of the prior art.

Since it is posible to insert the base plate subsequently into the complementary guides of the housing and to lock it in the housing, it is possible to provide the base plate with an ejection mechanism for the cassette. The ejection mechanism is formed by the spring element arranged at the rear wall of the base plate and a catch element holding the inserted cassette. Also, the base plate is provided with the arresting device which engages the reel hubs of the cassette. The container is completed by inserting the fully equipped base plate into the housing.

The magnetic tape cassette can be inserted into each individual compartment formed by the inserted base plates, for storage purposes. When the magnetic tape cassette is inserted, the arresting device in form of pegs is bent over in direction of movement of the cassette. When the cassette is fully inserted it springs back into its original position. The pegs then engage the teeth of the hubs of the tape reels and secure the tape reels. At the same time, the catch element engages in complementary recesses in the cassette housing and holds the cassette in this position against the pressure of the spring element which is stressed when the cassette is inserted.

A lock element projects beyond the front side of the container. When such a lock element is used, the catch element holding the cassette can be unlocked again. After its release, the cassette is pushed by the spring element far out of the compartment so that it can be gripped without difficulty and removed from the container.

In accordance with a preferable embodiment of the container, the catch element is a segment of the base plate, which is formed by cut-out areas of the base plate. The catch element has projections with a round-up slope and engages in recesses of the cassette housing. The catch element is released by a displaceable lock element inserted in a recess of the plate. The lock element has an operating bottom projecting beyond the front side of the housing. It is secured in the recess of the base plate by guide rails and/or locking projections engaging in openings in the lock element.

An arresting device can radially be bent over to secure the reels. This can be achieved in that the arresting device is formed by a hinged peg which is connected to the base plate by a spring wire bracket.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF A PREFERRED EMBODIMENT

Figure 1:
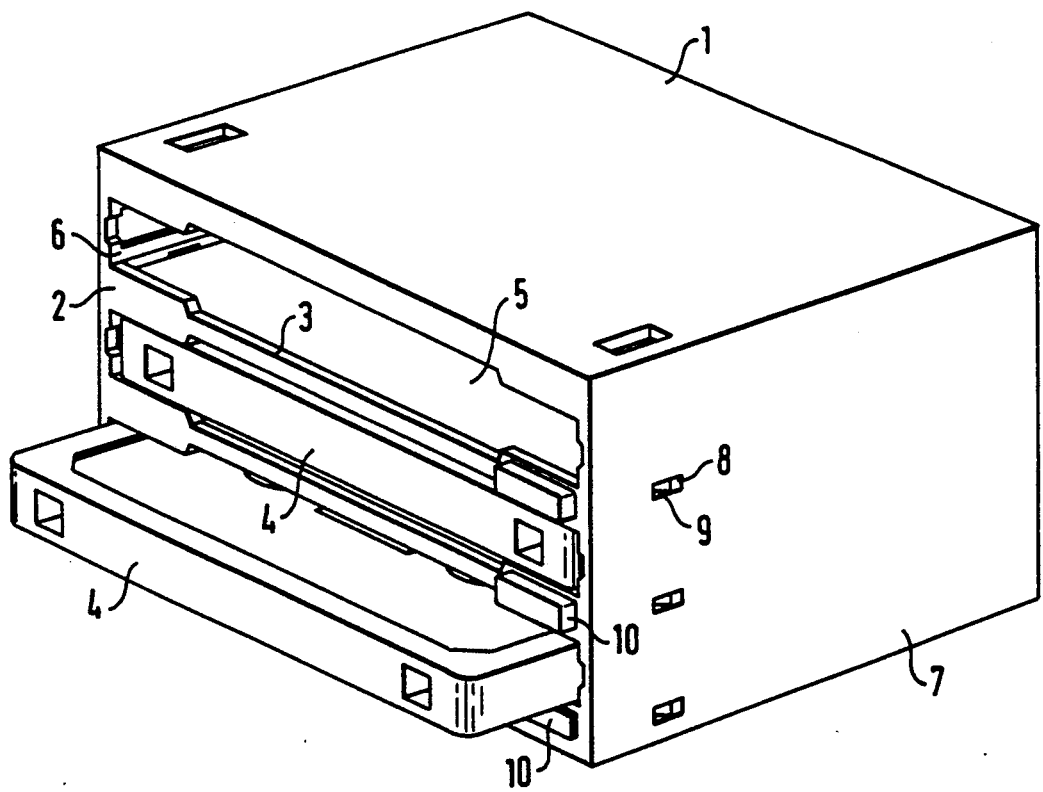
FIG. 1 is a perspective view of a container for magnetic tape cassettes in accordance with the present invention.
Figure 2:
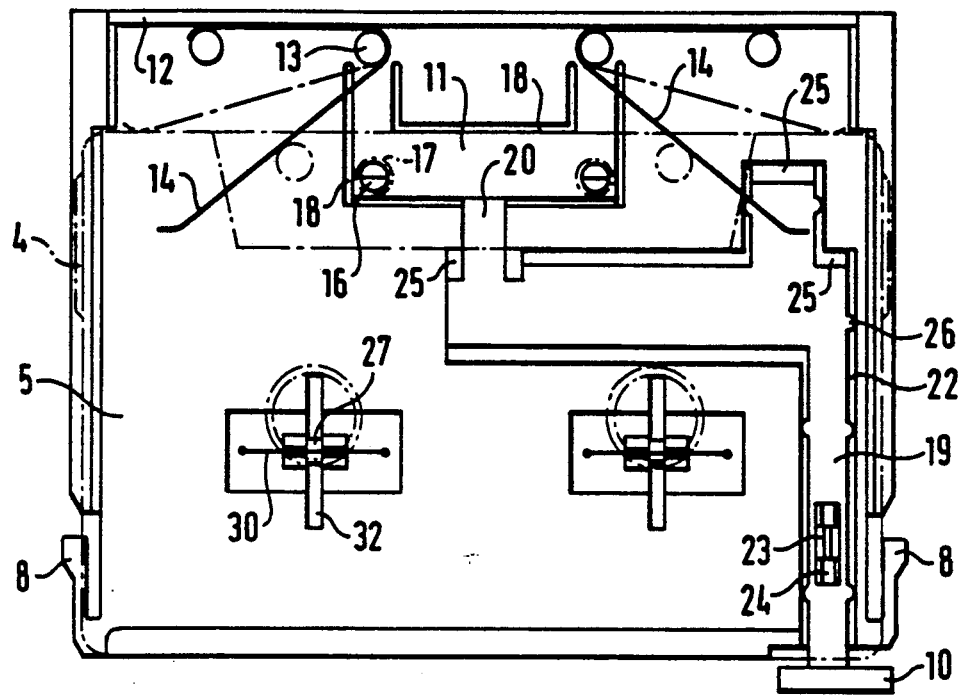
FIG. 2 is a plan view of a base plate of the container in accordance with the present invention.

A container for magnetic tape cassettes is identified as a whole with reference numeral 1. It has a front side 2 provided with several insertion openings 3 for insertion of magnetic tape cassettes 4. Base plates 5 are inserted from the rear side of the container into complementary guides 6 and divide the interior of the container 1 into individual compartments. The guides 6 are arranged on the inner side of side walls 7. Each base plate 5 has locking projections 8 at its lateral edges. The locking projections engage in recesses 9 of the side walls 7 of the container 1 in order to lock the base plate in the housing.

As shown in FIG. 1, the magnetic tape cassette 4 is fully inserted in the middle compartment of the container 1 and held in this position by a catch element 11. After pushing an operating button 10 the cassette 4 is released and pushed by two arms of a spring element 14 into a removal position shown in the lowermost compartment of the container 1. Each spring element 14 is formed by two arms and clamped between a rear wall 12 and pegs 13 arranged on the base plate. The arms of the spring element are bent sufficiently far to ensure that they bear on the cassette housing and do not damage the tape. When the cassette 4 is inserted the catch element 11 is pushed away downwards by round-up slopes 15 of projections 16. After the cassette 4 has reached its proper position shown in a broken line, two recesses 17 provided in the housing of the cassette are positioned exactly over the projections 16 of the catch element 11. The projections 16 are therefore locked in the recesses 17 of the cassette housing and hold the cassette in this position against the spring pressure of the spring element 14. The resiliency of the catch element 11 is obtained by parallel cut-out areas 18 in the base plate 5. The cut-out areas are arranged so that the catch element 11 is connected with the base plate only in two narrow joining zones.

Figure 3:
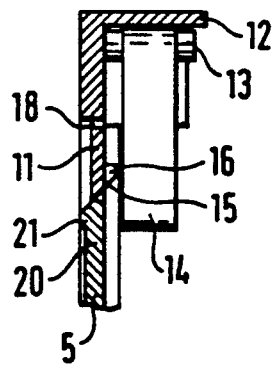
FIG. 3 is a view showing a detail of a catch element of the inventive container in section.

When the operating button 10 is pushed, a lock element 19 is moved in the direction of pressure. Therefore, a wedge-shaped projection 21 arranged on a bar of the lock element 19 pushes the catch element downwards as shown in FIG. 3. The projections 16 are released from the recesses 17 of the cassette housing and the spring elements 14 push the cassette 4 forward into the removal position shown in FIG. 1. A locking projection 23 engages in an opening 24 of the lock element 19 to secure the lock element 19 in a complementary recess 22 of the base plate 5. The opening 24 is formed as a slot. Furthermore, guide rails 25 engage in complementary pockets of the base plate 5 and can be arranged at several locations of the lock element 19. In order to improve the guidance of the lock element 19, guide lugs 26 are provided on the lateral edges of the lock element.

Figure 4:
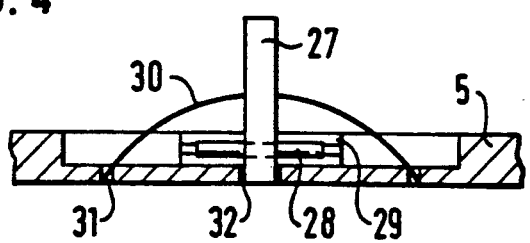
FIG. 4 is a view showing a detail of an arresting device of the inventive container, in section.

For preventing both reel hubs of the cassette from turning, resilient arresting devices are arranged in the base plate. As shown in FIG. 4, the arresting device includes a peg 27 which is pivotable in both directions of movement of the cassette. For this purpose the peg 27 has a hinged bolt 28 which is clipped in a bearing 29. The peg 27 is held in a vertical position by a spring wire bracket 30. The ends of the spring wire bracket are inserted in bores 31 in the base plate 5. When the peg 27 bends over, it is able to fit into openings 32 of the base plate 5. When the cassette 4 has been inserted, the spring wire bracket 30 pulls the peg upwardly again, so that it is able to engage the teeth of the reel hub of the cassette 4.

It will be understood that each of the elements described above, or two or more together, may also find a useful application in other types of constructions differing from the types described above.

While the invention has been illustrated and described as embodied in a container for magnetic tape cassettes, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A container for magnetic tape cassettes, comprising a housing having a plurality of insertion openings; a plurality of base plates subdividing said housing into a plurality of individual compartments; arresting means provided on said base plate and engageable in reel hubs of a cassette to prevent their turning when a cassette is inserted in said housing; guiding means formed so as to guide a cassette when a cassette is inserted in said housing and including complementary guides provided on said housing; stressing means formed so as to stress a cassette when a cassette is inserted in said housing and including a spring element arranged on a rear wall of said housing; a releasable catch element provided on said base plate and formed so as to hold a cassette when a cassette is inserted in said housing; and locking means formed for locking the cassette and including a recess provided in said base plate and a displaceable lock element inserted in said recess of said base plate, said lock element having an operating button projecting beyond a front side of said housing and a bar with a wedge shaped projection pressing said catch element away from the base plate.

2. A container as defined in claim 1, wherein said catch element is a segment formed by a part of said base plate between cut-out areas of said base plate, said segment having segment projections provided with a round-up slope engageable in recesses of a cassette.

3. A container as defined in claim 1; and further comprising means for securing said lock element in a recess of said base plate, said securing means including openings provided in said lock element and formations engaging in said openings of said lock element.

4. A container as defined in claim 3, wherein said formations engaging in said openings of said lock element are spaced guide rails.

5. A container as defined in claim 3, wherein said formations engaging in said openings of said lock element are locking projections.

6. A container as defined in claim 1, wherein said arresting means includes a hinged peg engageable in the reel hub of a cassette, and a spring wire bracket connecting said peg to said base plate.

7. A container as defined in claim 1, wherein said housing has lateral walls each provided with a recess, each of said base plates having two side edges each provided with a locking projection which locks in said recess of a respective one of said lateral walls of said housing.

* * * * *